US010963661B2

(12) United States Patent
Zhou

(10) Patent No.: US 10,963,661 B2
(45) Date of Patent: Mar. 30, 2021

(54) METHOD FOR OPTICAL FINGERPRINT COLLECTION AND RELATED PRODUCTS

(71) Applicant: GUANGDONG OPPO MOBILE TELECOMMUNICATIONS CORP., LTD., Guangdong (CN)

(72) Inventor: Yibao Zhou, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 13 days.

(21) Appl. No.: 16/591,472

(22) Filed: Oct. 2, 2019

(65) Prior Publication Data
US 2020/0034601 A1 Jan. 30, 2020

Related U.S. Application Data

(63) Continuation of application No. PCT/CN2018/082211, filed on Apr. 8, 2018.

(30) Foreign Application Priority Data
May 3, 2017 (CN) .......................... 201710305874.1

(51) Int. Cl.
*G06K 9/00* (2006.01)
*G06K 9/20* (2006.01)
(52) U.S. Cl.
CPC ....... *G06K 9/00013* (2013.01); *G06K 9/0004* (2013.01); *G06K 9/00046* (2013.01); *G06K 9/2027* (2013.01)
(58) Field of Classification Search
CPC ......... G06K 9/00006–0012; G06K 2009/0006
See application file for complete search history.

(56) References Cited

U.S. PATENT DOCUMENTS

| 7,623,689 B2* | 11/2009 | Shigeta ................ G06K 9/0004 283/68 |
| 9,893,102 B2* | 2/2018 | Raguin .............. G06K 9/00046 |

(Continued)

FOREIGN PATENT DOCUMENTS

| CN | 1620113 | 5/2005 |
| CN | 101276406 | 10/2008 |

(Continued)

OTHER PUBLICATIONS

EPO, Office Action for EP Application No. 18793986.3, dated Mar. 31, 2020.
WIPO, ISR for PCT/CN2018/082211, dated Jun. 28, 2018.

*Primary Examiner* — Patrick F Marinelli
(74) *Attorney, Agent, or Firm* — Hodgson Russ LLP

(57) ABSTRACT

A method for optical fingerprint collection and related products are provided. The method includes the following. When a terminal receives a fingerprint collection instruction, the terminal detects, with an optical sensor, a current ambient light intensity and sends, with the optical sensor, the current ambient light intensity to an application processor (AP). According to a correspondence relationship between ambient light intensities and light source intensities, the terminal obtains, with the AP, a target light source intensity corresponding to the current ambient light intensity. The terminal controls, with an optical fingerprint recognition module, an internal light source to emit lights having the target light source intensity and performs, with the optical fingerprint recognition module, fingerprint collection with the lights having the target light source intensity.

17 Claims, 9 Drawing Sheets

(56) References Cited

U.S. PATENT DOCUMENTS

| | | | | |
|---|---|---|---|---|
| 10,242,245 | B2* | 3/2019 | Robison | G06K 9/0004 |
| 10,713,467 | B2* | 7/2020 | Zhou | G06K 9/001 |
| 2005/0105785 | A1* | 5/2005 | Shigeta | G06K 9/2027 |
| | | | | 382/124 |
| 2008/0205713 | A1* | 8/2008 | Nagashita | G06K 9/00013 |
| | | | | 382/124 |
| 2013/0119237 | A1* | 5/2013 | Raguin | H01L 27/14601 |
| | | | | 250/208.1 |
| 2017/0076133 | A1 | 3/2017 | Hillmann et al. | |
| 2018/0306640 | A1* | 10/2018 | Pang | G01J 1/0247 |
| 2018/0322322 | A1* | 11/2018 | Zhou | G06K 9/001 |
| 2018/0365467 | A1* | 12/2018 | Robison | G06K 9/00087 |
| 2019/0102597 | A1* | 4/2019 | Lu | G09G 5/10 |
| 2020/0026900 | A1* | 1/2020 | Zhou | G06K 9/2036 |
| 2020/0034601 | A1* | 1/2020 | Zhou | G06K 9/2027 |

FOREIGN PATENT DOCUMENTS

| | | |
|---|---|---|
| CN | 201438308 | 4/2010 |
| CN | 104200205 | 12/2014 |
| CN | 104361276 | 2/2015 |
| CN | 104598899 | 5/2015 |
| CN | 104933421 | 9/2015 |
| CN | 104992094 | 10/2015 |
| CN | 105045495 | 11/2015 |
| CN | 105302596 | 2/2016 |
| CN | 105320943 | 2/2016 |
| CN | 105959592 | 9/2016 |
| CN | 106095295 | 11/2016 |
| CN | 106325987 | 1/2017 |
| CN | 106453723 | 2/2017 |
| CN | 106527952 | 3/2017 |

* cited by examiner

METHOD FOR OPTICAL FINGERPRINT COLLECTION AND RELATED PRODUCTS

CROSS-REFERENCE TO RELATED APPLICATIONS

This application is a continuation of International Application No. PCT/CN2018/082211, filed on Apr. 8, 2018, which claims priority to Chinese Patent Application No. 201710305874.1, filed on May 3, 2017, the entire disclosures of which are incorporated herein by reference.

TECHNICAL FIELD

This disclosure relates to the field of data transmission technologies, and more particularly to a method for optical fingerprint collection and related products.

BACKGROUND

With the popularity of terminals such as smart phones, in modern life, almost everybody has a mobile phone. Currently, mobile phones generally adopt a fingerprint recognition technology, and fingerprint recognition can be used in various scenarios such as terminal unlocking, mobile payment, and the like.

The optical fingerprint recognition technology is widely applied to a fingerprint recognition module of various terminals because of its good stability and high recognition sensitivity. An optical fingerprint recognition module generally includes a light source and an optical fingerprint detection module. An imaging principle of optical fingerprint recognition is as follows. The light source emits lights, and then the lights are reflected to the optical fingerprint recognition module after passing through a surface of a display screen on which a finger is pressed. The optical fingerprint recognition module receives the reflected lights and converts the received lights into fingerprint data for processing, so as to form a fingerprint image. A principle of fingerprint comparison is as follows. The optical fingerprint recognition module compares the formed fingerprint image with a pre-stored fingerprint image to obtain a comparison result.

However, the reflected lights received by the optical fingerprint recognition module may be easily interfered by ambient lights, which may result in deviation in the collected fingerprint data, thereby affecting a result of fingerprint matching.

SUMMARY

According to a first aspect of the present disclosure, a method for optical fingerprint collection is provided. The method is applicable to a terminal including an application processor (AP), an optical sensor, and an optical fingerprint recognition module. The optical fingerprint recognition module includes an internal light source. The method includes the following. When the terminal receives a fingerprint collection instruction, the terminal detects, with the optical sensor, a current ambient light intensity, and sends, with the optical sensor, the current ambient light intensity to the AP. According to a correspondence relationship between ambient light intensities and light source intensities, the terminal obtains, with the AP, a target light source intensity corresponding to the current ambient light intensity. The terminal controls, with the optical fingerprint recognition module, the internal light source to emit lights having the target light source intensity and performs, with the optical fingerprint recognition module, fingerprint collection with the lights having the target light source intensity.

According to a second aspect of the present disclosure, a terminal is provided. The terminal includes an AP, an optical sensor, and an optical fingerprint recognition module. The optical fingerprint recognition module includes an internal light source. When the terminal receives a fingerprint collection instruction, the optical sensor is configured to detect a current ambient light intensity, and to send the current ambient light intensity to the AP. The AP is configured to obtain a target light source intensity corresponding to the current ambient light intensity according to a correspondence relationship between ambient light intensities and light source intensities. The optical fingerprint recognition module is configured to control the internal light source to emit lights having the target light source intensity and perform fingerprint collection with the lights having the target light source intensity.

According to a third aspect of the present disclosure, a non-transitory computer readable storage medium is provided. The non-transitory computer readable storage medium stores a computer program which, when executed by a processor of a terminal, causes the processor to carry out part or all of the operations described in any method of the first aspect of the embodiments of the present disclosure.

BRIEF DESCRIPTION OF THE DRAWINGS

In order to describe technical solutions of embodiments of the present disclosure or the related art more clearly, the following will give a brief description of accompanying drawings used for describing the embodiments of the present disclosure or the related art. Apparently, accompanying drawings described below are merely some embodiments of the present disclosure. Those of ordinary skill in the art can also obtain other accompanying drawings based on the accompanying drawings described below without creative efforts.

DETAILED DESCRIPTION

Figure 1A:
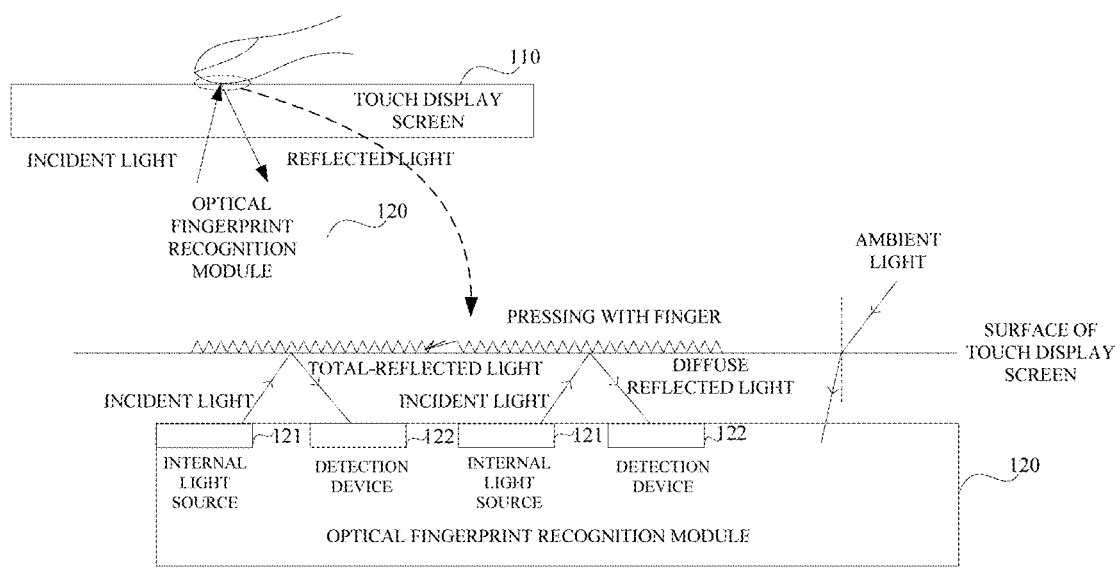
FIG. 1A is a schematic diagram illustrating a working principle of an optical fingerprint recognition module according to an embodiment of the present disclosure.

In order for those skilled in the art to better understand technical solutions of the present disclosure, technical solutions of embodiments of the present disclosure will be described clearly and completely with reference to accompanying drawings in the embodiments of the present disclosure. Apparently, embodiments described hereinafter are merely some embodiments, rather than all embodiments, of the present disclosure. All other embodiments obtained by those of ordinary skill in the art based on the embodiments of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "embodiment" referred to herein means that particular features, structures, or properties described in conjunction with the embodiments may be contained in at least one embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those skilled in the art that an embodiment described herein may be combined with other embodiments.

The terminal involved in the embodiments of the present disclosure may include various handheld devices, on-board devices, wearable devices, computing devices that have wireless communication functions, or other processing devices connected to a wireless modem, as well as various forms of user equipment (UE), mobile stations (MS), terminal devices, and the like. For convenience of description, the above-mentioned devices are collectively referred to as terminals.

Hereinafter, embodiments of the present disclosure will be described in detail.

According to an embodiment of the disclosure, a method for optical fingerprint collection is provided. The method is applicable to a terminal including an application processor (AP), an optical sensor, and an optical fingerprint recognition module. The optical fingerprint recognition module includes an internal light source. The method includes the following. When the terminal receives a fingerprint collection instruction, the terminal detects, with the optical sensor, a current ambient light intensity, and sends, with the optical sensor, the current ambient light intensity to the AP. According to a correspondence relationship between ambient light intensities and light source intensities, the terminal obtains, with the AP, a target light source intensity corresponding to the current ambient light intensity. The terminal controls, with the optical fingerprint recognition module, the internal light source to emit lights having the target light source intensity and performs, with the optical fingerprint recognition module, fingerprint collection with the lights having the target light source intensity.

According to an embodiment of the disclosure, a terminal is provided. The terminal includes an AP, an optical sensor, and an optical fingerprint recognition module. The optical fingerprint recognition module includes an internal light source. When the terminal receives a fingerprint collection instruction, the optical sensor is configured to detect a current ambient light intensity, and to send the current ambient light intensity to the AP. The AP is configured to obtain a target light source intensity corresponding to the current ambient light intensity according to a correspondence relationship between ambient light intensities and light source intensities. The optical fingerprint recognition module is configured to control the internal light source to emit lights having the target light source intensity and perform fingerprint collection with the lights having the target light source intensity.

According to an embodiment of the disclosure, a non-transitory computer readable storage medium is provided. The non-transitory computer readable storage medium stores a computer program which, when executed by a processor of a terminal, causes the processor to carry out following actions. When a fingerprint collection instruction is received, a current ambient light intensity is detected, and the current ambient light intensity is sent to an AP of the terminal. A target light source intensity corresponding to the current ambient light intensity is obtained according to a correspondence relationship between ambient light intensities and light source intensities. An internal light source of the terminal is controlled to emit lights having the target light source intensity and fingerprint collection is performed with the lights having the target light source intensity.

Embodiments of the present disclosure will be detailed below with reference to the accompanying drawings.

To better understand embodiments of the present disclosure, a work principle of an optical fingerprint recognition module provided in the embodiments of the present disclosure is introduced first. FIG. 1A is a schematic diagram illustrating a working principle of an optical fingerprint recognition module according to an embodiment of the present disclosure. As illustrated in FIG. 1A, a touch display screen 110 and an optical fingerprint recognition module 120 are illustrated. The optical fingerprint recognition module 120 includes an internal light source 121 and a detection device 122. The detection device 122 may be an array of charge-coupled devices (CCDs). In one example, the optical fingerprint recognition module 120 includes at least one internal light source 121 and at least one detection device 122. The internal light source 121 can emit lights, which can be referred to as incident lights. The incident lights pass through an area of the touch display screen that is in contact with a finger and then are reflected by patterns of the finger. Reflected lights are received and converted into electrical signal data by the detection device 122. According to the total reflection (also known as total internal reflection) principle, the optical fingerprint recognition module 120 can determine which incident lights are projected onto convex portions of a fingerprint (i.e., ridges of the fingerprint), and which incident lights are projected onto concave portions of the fingerprint (i.e., valleys of the fingerprint).

Referring to an enlarged dotted line area of FIG. 1A, in a surface of the touch display screen, the ridges of the fingerprint are in contact with the surface of the touch display screen 110, while the valleys of the fingerprint are not. On one hand, when incident lights generated by the optical fingerprint recognition module 120 are projected onto the valleys of the fingerprint, the incident lights are projected onto a surface of the touch display screen 110 that is in contact with air. In this case, total reflection of the incident lights can be achieved by designing incident angles of the incident lights (a refractive index of material of the touch display screen 110 is greater than 1, and a refractive index of the air is approximately equal to 1, accordingly, the refractive index of the material of the touch display screen 110 is set to be greater than that of the air). In this way, the optical fingerprint recognition module 120 can receive strong total-reflected lights. On the other hand, when incident lights generated by the optical fingerprint recognition module 120 are projected onto the ridges of the fingerprint, the incident lights are projected onto a surface of the touch display screen 110 that is in contact with the convex portions of the fingerprint. In this situation, since the incident lights are projected onto the convex portions of the fingerprint, diffuse reflection occurs. As such, the optical fingerprint recognition module 120 can receive weak diffuse reflected lights. Thereafter, the optical fingerprint recognition module 120 can form a fingerprint image according to received lights of different intensities. Since the refractive index of the material of the touch display screen is greater than that of the air, ambient lights may easily pass through the touch display screen and enter the optical fingerprint recognition module, which may interfere with the reflected lights received by the optical fingerprint recognition module.

Figure 1B:
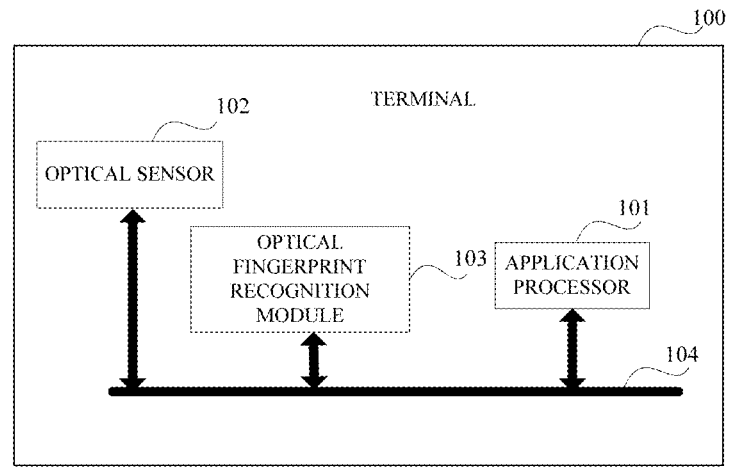
FIG. 1B is a schematic structural diagram illustrating a terminal according to an embodiment of the present disclosure.

FIG. 1B is a schematic structural diagram illustrating a terminal according to an embodiment of the present disclosure. As illustrated in FIG. 1B, a terminal 100 includes an application processor (AP) 101, an optical sensor 102, and an optical fingerprint recognition module 103. The optical fingerprint recognition module 103 includes an internal light source 1031 (not illustrated in FIG. 1B). The AP 101 is coupled with the optical sensor 102 and the optical fingerprint recognition module 103 via a bus 104.

The optical sensor 102 is configured to detect a current ambient light intensity when the terminal receives a fingerprint collection instruction and send the current ambient light intensity to the AP.

The fingerprint collection instruction may be input by a user, or may be generated in response to a touch operation of the user on a touch display screen. The touch display screen sends the fingerprint collection instruction to the AP of the terminal. When the terminal receives the fingerprint collection instruction, the optical sensor 102 detects the current ambient light intensity and sends the current ambient light intensity detected to the AP. The optical sensor 102 can detect a total ambient light intensity. In one example, the optical sensor 102 can detect, among ambient lights, ambient lights having a same wavelength as lights emitted by the internal light source 1031.

The AP 101 is configured to obtain a target light source intensity corresponding to the current ambient light intensity according to a correspondence relationship between ambient light intensities and light source intensities.

The correspondence relationship between the ambient light intensities and the light source intensities may be pre-stored in a memory of the terminal, such as a non-transitory memory. Generally, the ambient light intensities have a positive correlation with the light source intensities, the higher an ambient light intensity, the higher a corresponding light source intensity, and a light source intensity is usually higher than a corresponding ambient light intensity. For instance, the corresponding relationship between the ambient light intensities and the light source intensities can be set as a proportion relationship, for example, a ratio of an ambient light intensity to a corresponding light source intensity is 1:4. Specifically, a corresponding light source intensity is 200 when an ambient light intensity is 50. Likewise, a corresponding light source intensity is 400 when an ambient light intensity is 100. It is to be noted that the value of above light intensities are obtained through the same standard normalization processing. The ambient lights can be comprehended as noise. In order to prevent the noise from masking real fingerprint data, lights emitted by the internal light source 1031 are required to have an intensity much higher than the ambient lights, so as to ensure high accuracy of the fingerprint data collected. In general, the greater a difference between an intensity of the ambient lights and an intensity of the lights emitted by the internal light source 1031, the higher the accuracy of the fingerprint data collected by the optical fingerprint recognition module 103. Due to a limitation on a power of the internal light source 1031, the intensity of the lights emitted by the internal light source 1031 will be generally adjusted to the maximum when the ambient lights have a strong intensity.

The optical fingerprint recognition module 103 is configured to control the internal light source 1031 to emit lights having the target light source intensity for fingerprint collection.

The internal light source 1031 of the optical fingerprint recognition module 103 is configured to emit lights of different intensities. When the ambient light intensity is detected to be strong, in order to reduce the influence of ambient lights on fingerprint collection (where the fingerprint collection is performed by means of the lights emitted by the internal light source 1031), the internal light source 1031 emits lights having a strong target light source intensity for fingerprint collection. When the ambient light intensity is detected to be weak, the internal light source 1031 emits lights having a weak target light source intensity for fingerprint collection, to save power consumption of the internal light source 1031.

According to the embodiments of the present disclosure, the internal light source of the optical fingerprint recognition module does not emit lights of a same light source intensity for fingerprint collection, instead, an intensity of lights emitted by the internal light source is adjusted according to an intensity of ambient lights, which can reduce interference of the ambient lights on the optical fingerprint collection and therefore, the accuracy of the fingerprint data collected during the optical fingerprint collection can be improved.

In one embodiment, the AP 101 is further configured to determine whether the current ambient light intensity is lower than a preset light source intensity. When the current ambient light intensity is lower than the preset light source intensity, the AP 101 is further configured to detect whether a current time falls within a preset night-time interval. When the current time falls within the preset night-time interval, the optical fingerprint recognition module 103 is further configured to control the internal light source to emit the lights having the target light source intensity for fingerprint collection.

The preset light source intensity may be set in advance and stored in the non-transitory memory of the terminal. The preset light source intensity can be set to be brightness at dusk. Generally, when the current ambient light intensity is lower than the preset light source intensity, the current ambient light intensity is considered to be low (i.e., currently the ambient light intensity is weak), in this situation, the AP 101 further determines whether the current time falls within the preset night-time interval. The preset night-time interval referred to herein is an interval from 19:00 pm to 6:00 am for example. In one example, when the current time falls within the preset night-time interval (which indicates that at the current time an actual ambient light intensity is low) and when the ambient light intensity is detected to be low, it is determined that the brightness of the ambient lights currently detected is relatively accurate. In this case, the optical fingerprint recognition module 103 controls the internal light source to emit the lights having the target light source intensity for fingerprint collection. By implementing the embodiments of the present disclosure, it is possible to determine whether the ambient light intensity currently detected is accurate according to the current ambient light intensity and the current time. As such, the accuracy of the fingerprint data obtained during the optical fingerprint collection can be further improved.

Figure 1C:
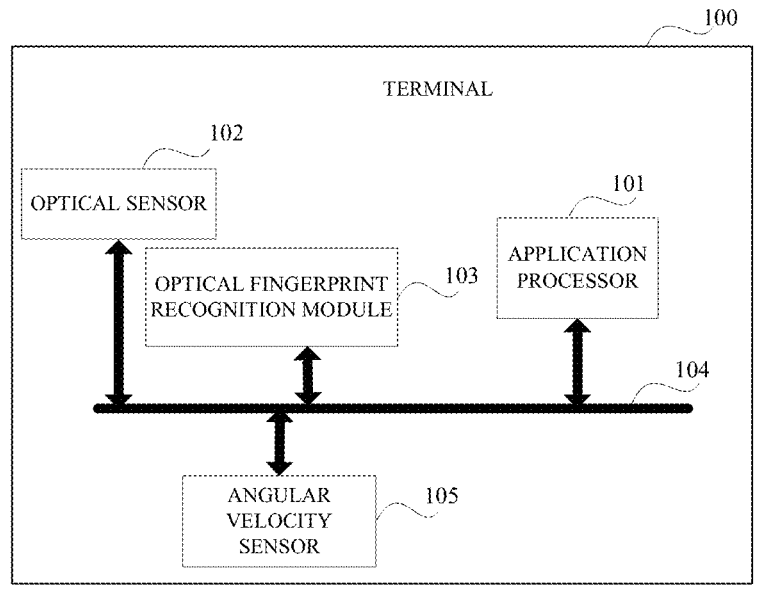
FIG. 1C is a schematic structural diagram illustrating a terminal according to another embodiment of the present disclosure.

In one embodiment, as illustrated in FIG. 1C, the terminal further includes an angular velocity sensor 105 (e.g., gyroscope). The angular velocity sensor 105 is configured to detect an angular velocity of the terminal when the current time does not fall within the preset night-time interval. When the angular velocity sensor 105 detects that the angular velocity of the terminal is greater than a preset angular velocity, the AP 101 is further configured to skip execution of the fingerprint collection instruction. When the angular velocity sensor 105 detects that the angular velocity of the terminal is smaller than or equal to the preset angular velocity, the optical fingerprint recognition module 103 is further configured to control the internal light source to emit the lights having the target light source intensity for fingerprint collection.

In one example, when the current time does not fall within the preset night-time interval, it indicates that the ambient light intensity currently detected does not match an expected ambient light intensity at the current time. In this situation, the angular velocity sensor 105 is configured to detect the angular velocity of the terminal to determine whether the terminal is in a motion state. If the current time is daytime, when the terminal is in the motion state and the current ambient light intensity is low, the terminal can be considered to be in a user's pocket or bag. In this case, the fingerprint collection instruction received by the terminal is triggered due to an accidental operation to a large extent, and therefore, the AP 101 skips execution of the fingerprint collection instruction. By adopting the embodiments of the present disclosure, whether the fingerprint collection instruction received by the terminal is triggered due to an accidental operation can be determined when the ambient light intensity currently detected does not match the expected ambient light intensity at the current time. In the event that it is determined to be triggered due to the accidental operation, skip execution of the fingerprint collection instruction. In this way, it is possible to prevent the fingerprint collection from being triggered due to an accidental operation, without triggering the internal light source of the optical fingerprint recognition module 103 to work, thereby saving the power consumption of the optical fingerprint recognition module 103.

In one embodiment, when the current ambient light intensity is higher than or equal to the preset light source intensity, the AP is further configured to detect whether the current time falls within a preset daytime time interval. When the current time falls within the preset daylight time interval, the optical fingerprint recognition module is further configured to control the internal light source to emit the lights having the target light source intensity for fingerprint collection.

The preset light source intensity may be set in advance and stored in the non-transitory memory. The preset light source intensity can be set to be brightness at dusk. Generally, when the current ambient light intensity is higher than or equal to the preset light source intensity, the current ambient light intensity is considered to be strong, in this situation, the AP 101 further detects whether the current time falls within the preset daytime time interval. The preset daytime time interval referred to herein may be an interval from 7:00 am to 18:00 pm. In one example, when the current time falls within the preset daytime time interval (which indicates that at the current time an actual ambient light intensity is strong) and when the ambient light intensity detected is detected to be strong, it is determined that the brightness of the ambient lights currently detected is relatively accurate. In this case, the optical fingerprint recognition module 103 controls the internal light source emits the lights having the target light source intensity for fingerprint collection. By implementing the embodiments of the present disclosure, it is possible to determine whether the ambient light intensity currently detected is accurate according to the current ambient light intensity and the current time. As such, the accuracy of the fingerprint data obtained during the optical fingerprint collection can be further improved.

Figure 1D:
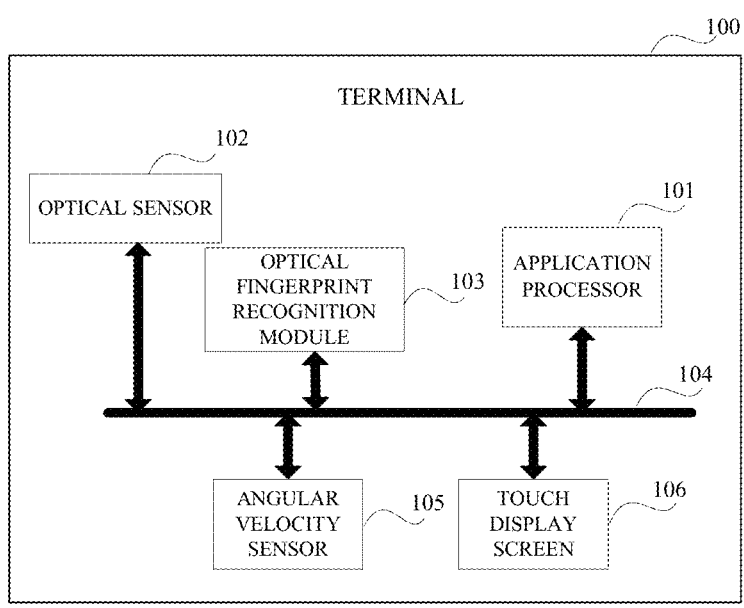
FIG. 1D is a schematic structural diagram illustrating a terminal according to still another embodiment of the present disclosure.

In one embodiment, as illustrated in FIG. 1D, the terminal further includes a touch display screen 106. The optical fingerprint recognition module has a fingerprint recognition area located in a first area of the touch display screen 106. The fingerprint collection instruction is generated when the touch display screen 106 detects a touch operation of a user in the first area.

Figure 1E:
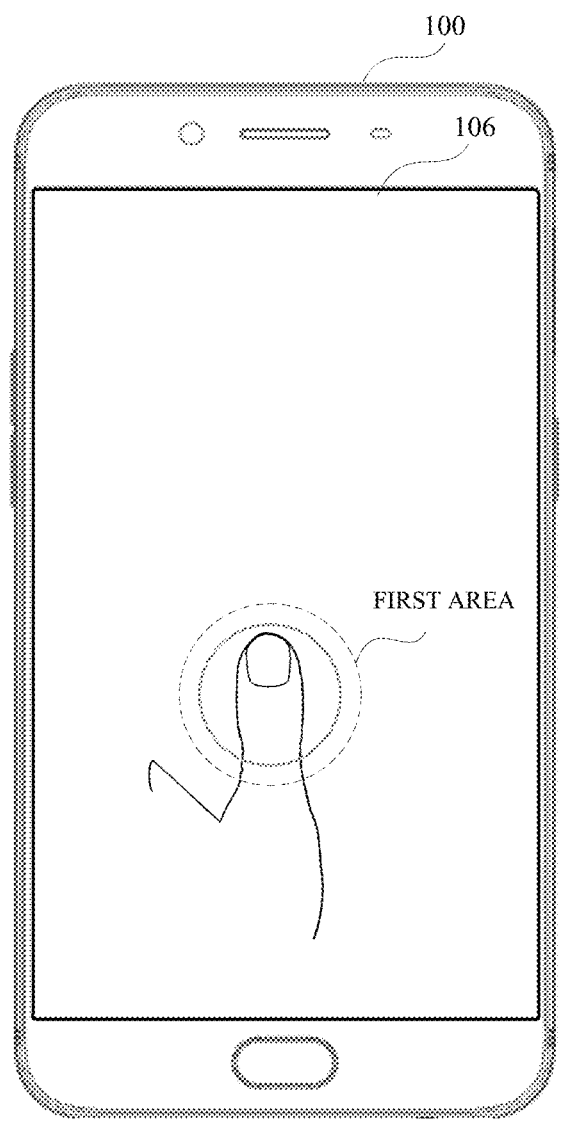
FIG. 1E is a schematic structural diagram illustrating a fingerprint recognition area according to an embodiment of the present disclosure.

In the embodiments of the present disclosure, the fingerprint collection instruction is generated in response to the touch of the user in the first area of the touch display screen 106. The first area may be any preset area of the touch display screen 106. The preset area may be located at any position of the touch display screen 106, such as, on the upper left side (as illustrated in FIG. 1E), the upper side, the lower side, the left side, and the right side of the touch display screen 106. The size of the preset area is able to be covered by the fingerprint area of the finger. The preset area may be any shape, such as, a circular shape, an elliptical shape, a quadrangular shape (e.g., a rectangular shape), a fingerprint-like shape, and so on, which is not limited herein.

The touch display screen 106 of embodiments of the present disclosure may be a thin film transistor-liquid crystal display (TFT-LCD), a light emitting diode (LED) display, an organic light-emitting diode (OLED) display, or the like.

The touch display screen 106 in embodiments of the present disclosure may include a touch screen and a display screen. The touch screen and the display screen are stacked, and the display screen is disposed on a bottom surface of the touch screen.

According to the embodiments of the present disclosure, the internal light source of the optical fingerprint recognition module does not emit lights of a same light source intensity for fingerprint collection, instead, an intensity of lights emitted by the internal light source is adjusted according to an intensity of ambient lights, which can reduce interference of the ambient lights on the optical fingerprint collection and therefore, the accuracy of the fingerprint data collected during the optical fingerprint collection can be improved.

Figure 2:
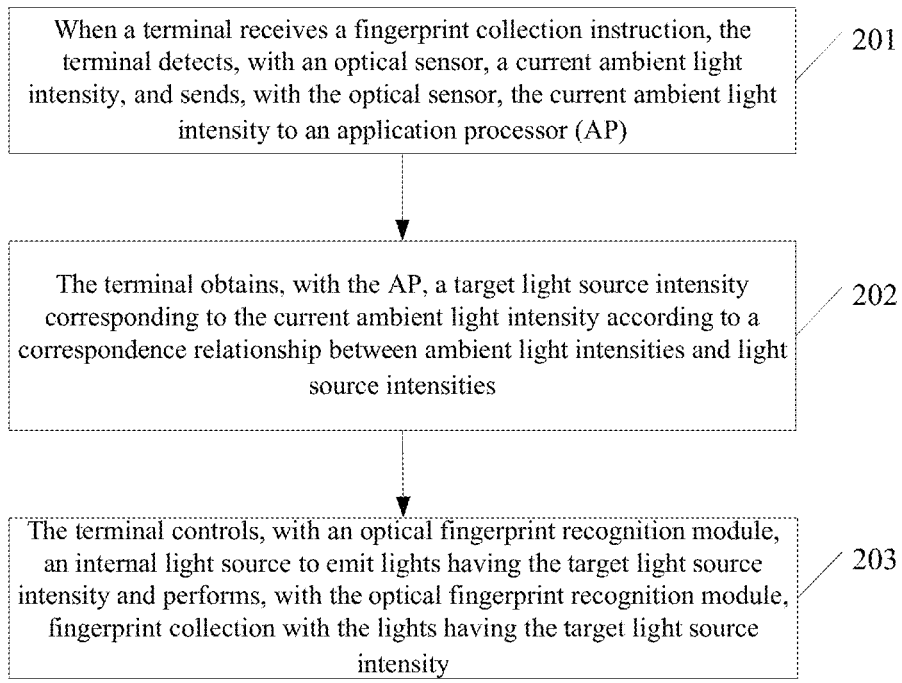
FIG. 2 is a schematic flowchart illustrating a method for optical fingerprint collection according to an embodiment of the present disclosure.

FIG. 2 is a schematic flowchart illustrating a method for optical fingerprint collection according to an embodiment of the present disclosure. The method is applicable to a terminal including an AP, an optical sensor, and an optical fingerprint recognition module. The optical fingerprint recognition module includes an internal light source. As illustrated in FIG. 2, the method begins at block 201.

At block 201, when the terminal receives a fingerprint collection instruction, the terminal detects, with the optical sensor, a current ambient light intensity, and sends, with the optical sensor, the current ambient light intensity to the AP.

At block 202, the terminal obtains, with the AP, a target light source intensity corresponding to the current ambient light intensity according to a correspondence relationship between ambient light intensities and light source intensities.

At block 203, the terminal controls, with the optical fingerprint recognition module, the internal light source to emit lights having the target light source intensity for fingerprint collection.

According to the embodiments of the present disclosure, the internal light source of the optical fingerprint recognition module does not emit lights of a same light source intensity for fingerprint collection, instead, an intensity of lights emitted by the internal light source is adjusted according to an intensity of ambient lights, which can reduce interference of the ambient lights on the optical fingerprint collection, thereby improving the accuracy of the fingerprint data collected during the optical fingerprint collection.

Figure 3:
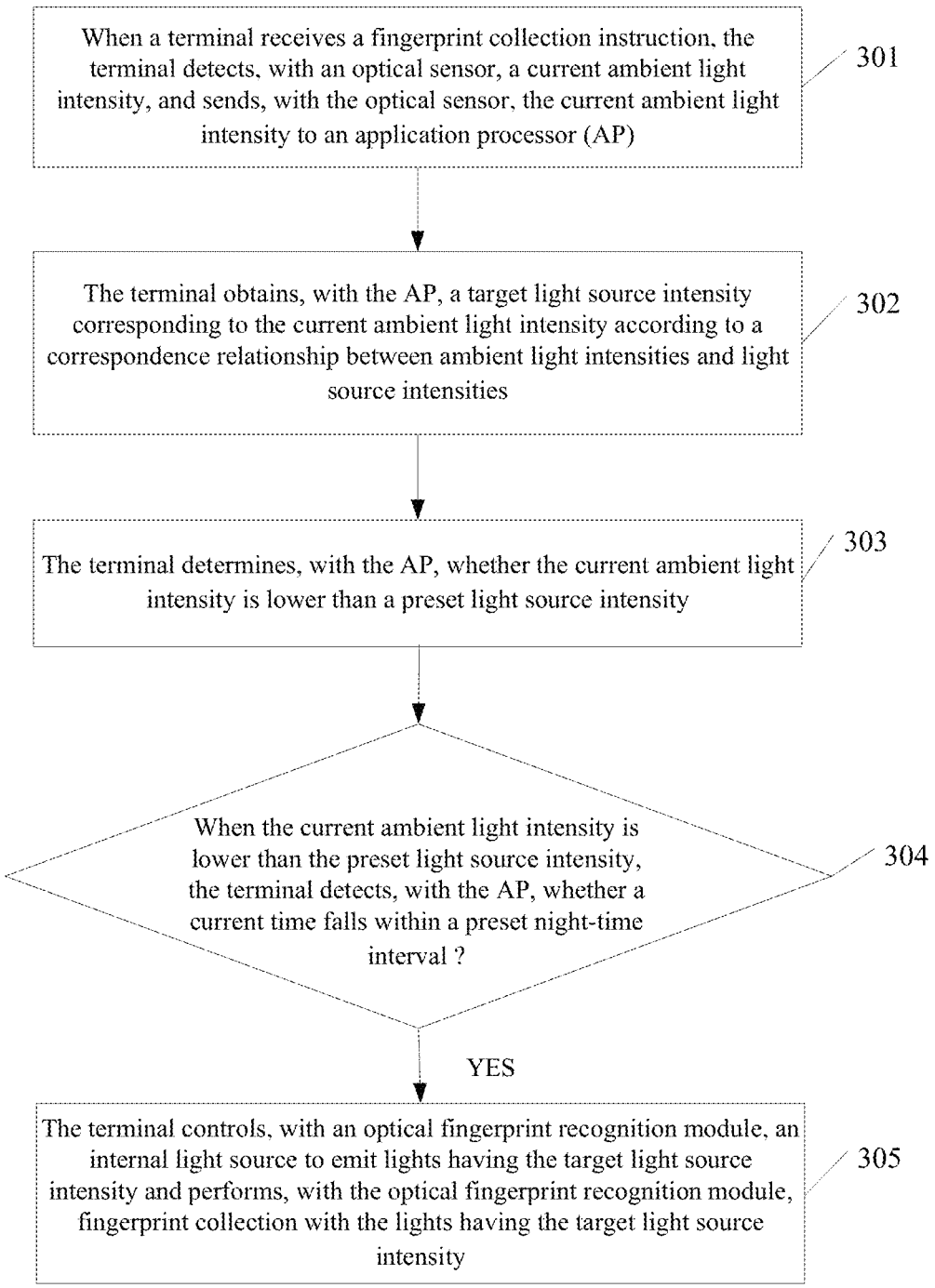
FIG. 3 is a schematic flowchart illustrating a method for optical fingerprint collection according to another embodiment of the present disclosure.

FIG. 3 is a schematic flowchart illustrating a method for optical fingerprint collection according to another embodiment of the present disclosure. The method is applicable to a terminal including an AP, an optical sensor, and an optical fingerprint recognition module. The optical fingerprint recognition module includes an internal light source. As illustrated in FIG. 3, the method begins at block 301.

At block 301, when the terminal receives a fingerprint collection instruction, the terminal detects, with the optical sensor, a current ambient light intensity, and sends, with the optical sensor, the current ambient light intensity to the AP.

At block 302, the terminal obtains, with the AP, a target light source intensity corresponding to the current ambient light intensity according to a correspondence relationship between ambient light intensities and light source intensities.

For details of the operations from 301 to 302, reference can be made to the operations from 201 to 202 described in conjunction with in FIG. 2, and it will not be repeated herein.

At block 303, the terminal determines, with the AP, whether the current ambient light intensity is lower than a preset light source intensity.

At block 304, when the current ambient light intensity is lower than the preset light source intensity, the terminal detects, with the AP, whether a current time falls within a preset night-time interval. If the current time falls within the preset night-time interval, proceed to operations at 305.

At block 305, the terminal controls, with the optical fingerprint recognition module, the internal light source to emit lights having the target light source intensity for fingerprint collection.

According to the embodiments of the present disclosure, the internal light source of the optical fingerprint recognition module does not emit lights of a same light source intensity for fingerprint collection, instead, an intensity of lights emitted by the internal light source is adjusted according to an intensity of ambient lights, which can reduce interference of the ambient lights on the optical fingerprint collection, thereby improving the accuracy of the fingerprint data collected during the optical fingerprint collection. In the embodiments of the present disclosure, it is possible to determine whether the ambient light intensity currently detected is accurate according to the current ambient light intensity and the current time. As such, the accuracy of the fingerprint data obtained during the optical fingerprint collection can be further improved.

Figure 4:
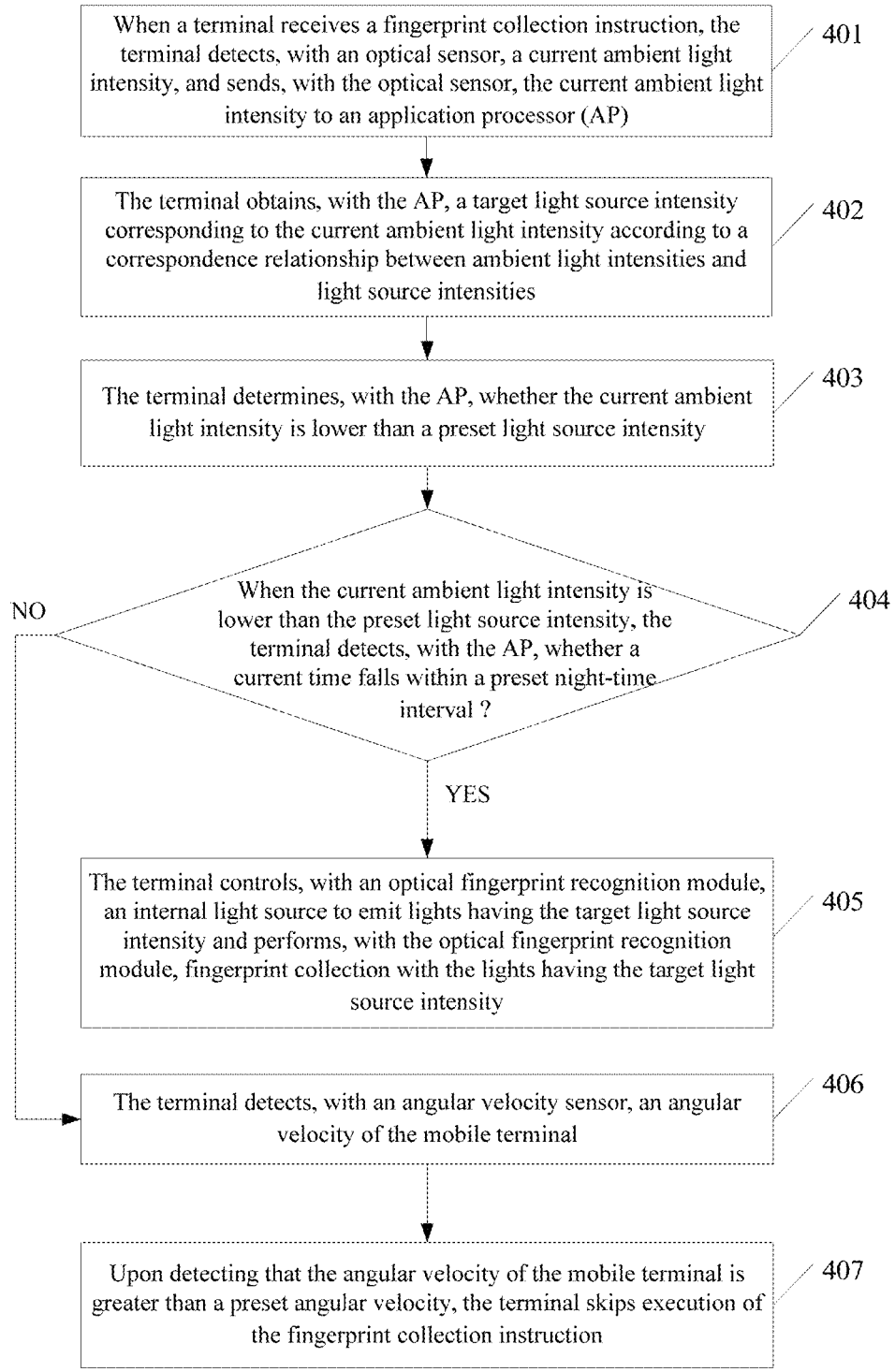
FIG. 4 is a schematic flowchart illustrating a method for optical fingerprint collection according to still another embodiment of the present disclosure.

FIG. 4 is a schematic flowchart illustrating a method for optical fingerprint collection according to still another embodiment of the present disclosure. The method is applicable to a terminal including an AP, an optical sensor, an optical fingerprint recognition module, and an angular velocity sensor. The optical fingerprint recognition module includes an internal light source. As illustrated in FIG. 4, the method begins at block 401.

At block 401, when the terminal receives a fingerprint collection instruction, the terminal detects, with the optical sensor, a current ambient light intensity, and sends, with the optical sensor, the current ambient light intensity to the AP.

At block 402, the terminal obtains, with the AP, a target light source intensity corresponding to the current ambient light intensity according to a correspondence relationship between ambient light intensities and light source intensities.

At block 403, the terminal determines, with the AP, whether the current ambient light intensity is lower than a preset light source intensity.

At block 404, when the current ambient light intensity is lower than the preset light source intensity, the terminal detects, with the AP, whether a current time falls within a preset night-time interval. If the current time falls within the preset night-time interval, proceed to operations at 405. If the current time does not fall within the preset night-time interval, proceed to operations at 406.

At block 405, the terminal controls, with the optical fingerprint recognition module, the internal light source to emit lights having the target light source intensity for fingerprint collection.

For details of the operations from 401 to 405, reference can be made to the operations from 301 to 305 described in conjunction with in FIG. 3, and it will not be repeated herein.

At block 406, the terminal detects, with the angular velocity sensor, an angular velocity of the terminal.

At block 407, upon detecting that the angular velocity of the terminal is greater than a preset angular velocity, the terminal skips execution of the fingerprint collection instruction.

Upon detecting that the angular velocity of the terminal is smaller than or equal to the preset angular velocity, proceed to operations at 405.

According to the embodiments of the present disclosure, the internal light source of the optical fingerprint recognition module does not emit lights of a same light source intensity for fingerprint collection, instead, an intensity of lights emitted by the internal light source is adjusted according to an intensity of ambient lights, which can reduce interference of the ambient lights on the optical fingerprint collection and therefore, the accuracy of the fingerprint data collected during the optical fingerprint collection can be improved. By implementing the embodiments of the present disclosure, it is possible to prevent the fingerprint collection from being triggered due to an accidental operation, without triggering the internal light source of the optical fingerprint recognition module to work, thereby saving the power consumption of the optical fingerprint recognition module.

Figure 5:
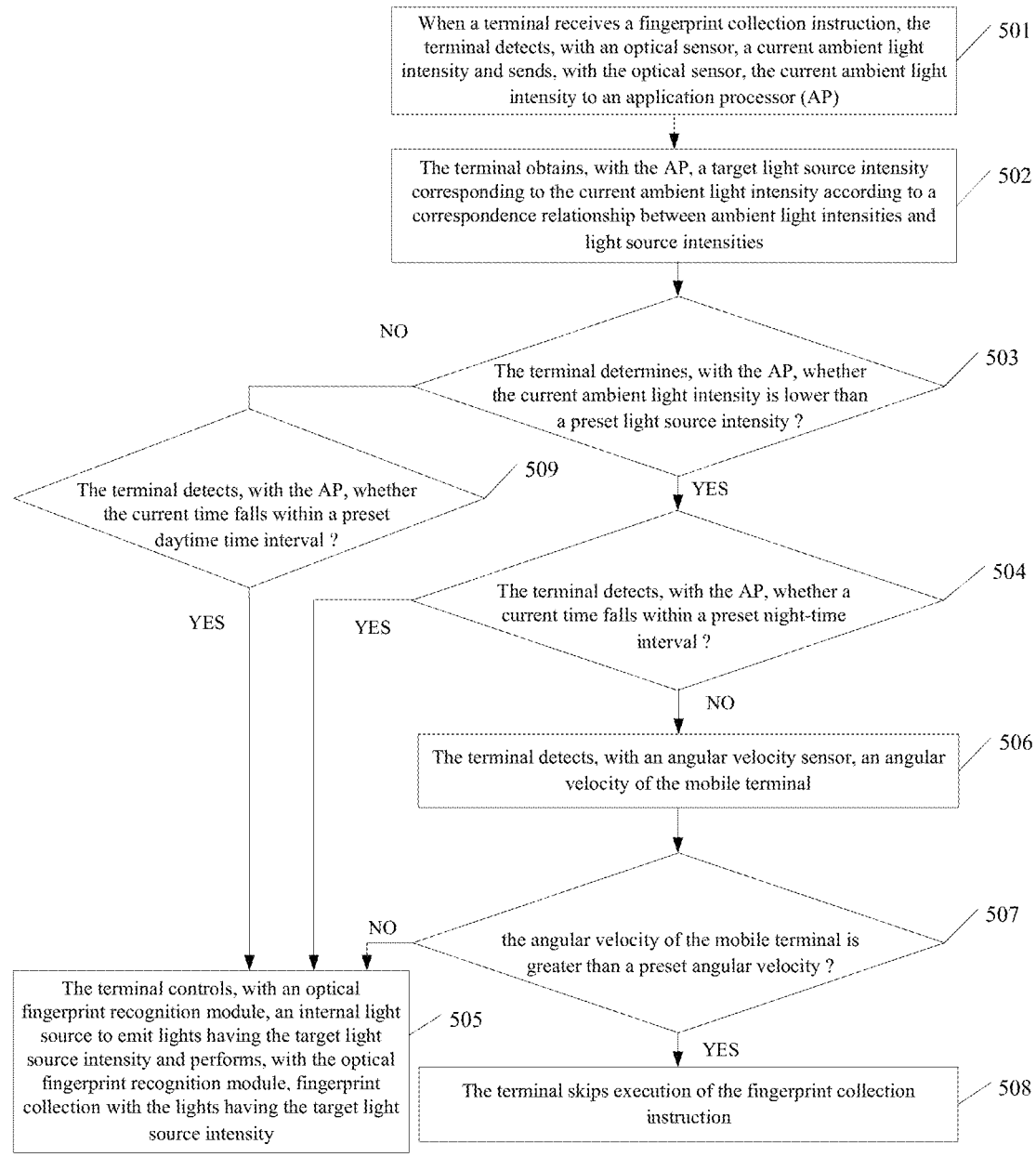
FIG. 5 is a schematic flowchart illustrating a method for optical fingerprint collection according to yet another embodiment of the present disclosure.

FIG. 5 is a schematic flowchart illustrating a method for optical fingerprint collection according to yet another embodiment of the present disclosure. The method is applicable to a terminal including an AP, an optical sensor, an optical fingerprint recognition module, and an angular velocity sensor. The optical fingerprint recognition module includes an internal light source. As illustrated in FIG. 5, the method begins at block 501.

At block 501, when the terminal receives a fingerprint collection instruction, the terminal controls the optical sensor to detect a current ambient light intensity, and to send the current ambient light intensity to the AP.

At block 502, the terminal obtains, with the AP, a target light source intensity corresponding to the current ambient light intensity according to a correspondence relationship between ambient light intensities and light source intensities.

At block 503, the terminal determines, with the AP, whether the current ambient light intensity is lower than a preset light source intensity.

At block 504, when the current ambient light intensity is lower than the preset light source intensity, the terminal detects, with the AP, whether a current time falls within a preset night-time interval. When the current time falls within the preset night-time interval, proceed to operations at 505. When the current time does not fall within the preset night-time interval, proceed to operations at 506.

At block 505, the terminal controls, with the optical fingerprint recognition module, the internal light source to emit lights having the target light source intensity and performs, with the optical fingerprint recognition module, fingerprint collection with the lights having the target light source intensity.

At block 506, the terminal detects, with the angular velocity sensor, an angular velocity of the terminal.

At block 507, the terminal determines whether the angular velocity of the terminal is greater than a preset angular velocity. When the angular velocity of the terminal is greater than the preset angular velocity, proceed to operations at 508; otherwise, proceed to operations at 505.

At block 508, when the angular velocity of the terminal is greater than the preset angular velocity, the terminal skips execution of the fingerprint collection instruction.

For details of the operations from 501 to 508, reference can be made to the operations from 401 to 407 described in conjunction with in FIG. 4, and it will not be repeated herein.

At block 509, when the current ambient light intensity is higher than or equal to the preset light source intensity, the terminal detects, with the AP, whether the current time falls within a preset daytime time interval. If the current time falls within the preset daylight time interval, proceed to operations at 505.

In one embodiment, the terminal further includes a touch display screen. The optical fingerprint recognition module has a fingerprint recognition area corresponding to a first area of the touch display screen. The fingerprint collection instruction is generated when the touch screen display detects a touch operation of a user in the first area.

According to the embodiments of the present disclosure, the internal light source of the optical fingerprint recognition module does not emit lights of a same light source intensity for fingerprint collection, instead, an intensity of lights emitted by the internal light source is adjusted according to an intensity of ambient lights, which can reduce interference of the ambient lights on the optical fingerprint collection, thereby improving the accuracy of the fingerprint data collected during the optical fingerprint collection. By implementing the embodiments of the present disclosure, it is possible to determine whether the ambient light intensity currently detected is accurate according to the current ambient light intensity and the current time. As such, the accuracy of the fingerprint data obtained during the optical fingerprint collection can be further improved.

Figure 6:
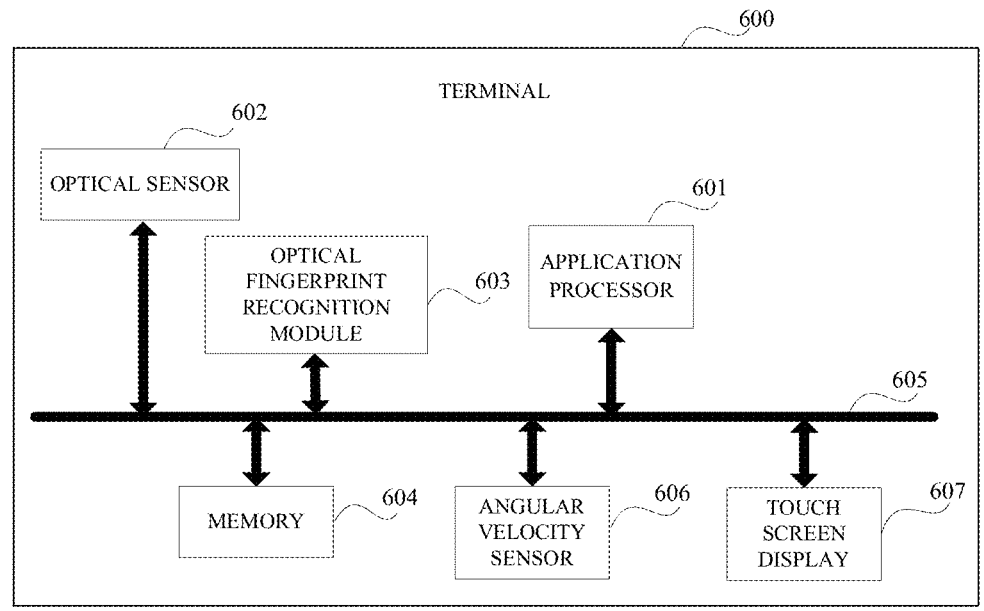
FIG. 6 is a schematic structural diagram illustrating a terminal according to another embodiment of the present disclosure.

FIG. 6 is a schematic structural diagram illustrating a terminal according to another embodiment of the present disclosure. As illustrated in FIG. 6, a terminal 600 includes an AP 601, an optical sensor 602, an optical fingerprint recognition module 603, a memory 604, and one or more programs. The optical fingerprint recognition module 603 includes an internal light source. The AP 601 is coupled with the optical sensor 602, the optical fingerprint recognition module 603, and the memory 604 via a data bus 605.

The one or more programs are stored in the memory 604 and configured to be executed by the AP 601. The one or more programs include instructions configured to: control the optical sensor 602 to detect a current ambient light intensity when a fingerprint collection instruction is received and to send the current ambient light intensity to the AP 601; obtain a target light source intensity corresponding to the current ambient light intensity according to a correspondence relationship between ambient light intensities and light source intensities; and control, with the optical fingerprint recognition module 603, the internal light source to emit lights having the target light source intensity and perform, with the optical fingerprint recognition module 603, fingerprint collection with the lights having the target light source intensity.

In one embodiment, the one or more programs further include instructions configured to: determine whether the current ambient light intensity is lower than a preset light source intensity; detect whether a current time falls within a preset night-time interval when the current ambient light intensity is lower than the preset light source intensity; and control, with the optical fingerprint recognition module, the internal light source to emit the lights having the target light source intensity and perform, with the optical fingerprint recognition module, fingerprint collection with the lights having the target light source intensity, when the current time falls within the preset night-time interval.

In one embodiment, the terminal further includes an angular velocity sensor 606. The one or more programs further include instructions configured to: detect, with the angular velocity sensor 606, an angular velocity of the terminal when the current time does not fall within the preset night-time interval; and skip execution of the fingerprint collection instruction upon detecting that the angular velocity of the terminal is greater than a preset angular velocity.

In one embodiment, the one or more programs further include instructions configured to: detect whether the current time falls within a preset daytime time interval when the current ambient light intensity is higher than or equal to the preset light source intensity; and control, with the optical fingerprint recognition module 603, the internal light source to emit the lights having the target light source intensity and perform, with the optical fingerprint recognition module 603, fingerprint collection with the lights having the target light source intensity, when the current time falls within the preset daylight time interval.

In one embodiment, the terminal further includes a touch display screen 607. The optical fingerprint recognition module 603 has a fingerprint recognition area corresponding to a first area of the touch display screen. The fingerprint collection instruction is generated when the touch screen display 607 detects a touch operation of a user in the first area.

According to the embodiments of the present disclosure, the internal light source of the optical fingerprint recognition module does not emit lights of a same light source intensity for fingerprint collection, instead, an intensity of lights emitted by the internal light source is adjusted according to an intensity of ambient lights, which can reduce interference of the ambient lights on the optical fingerprint collection. As such, the accuracy of the fingerprint data collected during the optical fingerprint collection can be improved.

Figure 7:
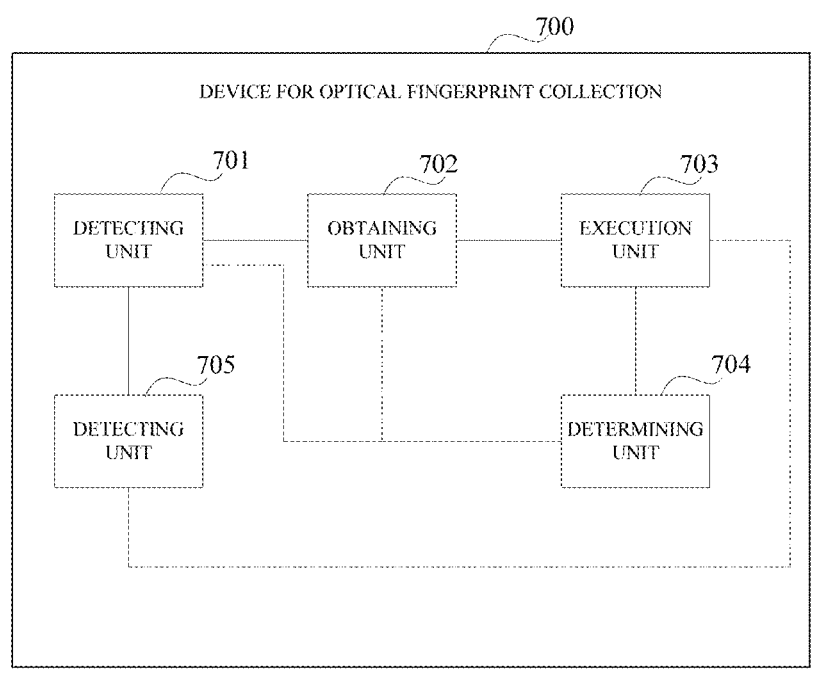
FIG. 7 is a schematic structural diagram illustrating a device for optical fingerprint collection according to an embodiment of the present disclosure.

FIG. 7 is a schematic structural diagram illustrating a device for optical fingerprint collection according to an embodiment of the present disclosure. The device 700 for optical fingerprint collection is applicable to a terminal including an AP, an optical sensor, and an optical fingerprint recognition module. The optical fingerprint recognition module includes an internal light source. The device 700 for optical fingerprint collection includes a detecting unit 701, an obtaining unit 702, and an execution unit 703. The detecting unit 701 is configured to detect, with the optical sensor, a current ambient light intensity when the terminal receives a fingerprint collection instruction and send, with the optical sensor, the current ambient light intensity to the AP. The obtaining unit 702 is configured to obtain, with the AP, a target light source intensity corresponding to the current ambient light intensity according to a correspondence relationship between ambient light intensities and light source intensities. The execution unit 703 is configured to control, with the optical fingerprint recognition module, the internal light source to emit lights having the target light source intensity for fingerprint collection.

According to the embodiments of the present disclosure, the internal light source of the optical fingerprint recognition module no longer emits lights of a same light source intensity for fingerprint collection, but adjusts an intensity of lights emitted by the internal light source according to an intensity of ambient lights, which can reduce interference of the ambient lights on the optical fingerprint collection and therefore, the accuracy of the fingerprint data collected during the optical fingerprint collection can be improved.

In one embodiment, the device 700 for optical fingerprint collection further includes a determining unit 704. The determining unit 704 is configured to determine, with the AP, whether the current ambient light intensity is lower than a preset light source intensity. The detecting unit 701 is further configured to detect, with the AP, whether a current time falls within a preset night-time interval when the determining unit 704 determines that the current ambient light intensity is lower than the preset light source intensity. The execution unit 703 is further configured to control the internal light source to emit the lights having the target light source intensity and control the optical fingerprint recognition module to collect the fingerprints with the lights having the target light source intensity, when the current time falls within the preset night-time interval.

In one embodiment, the device 700 for optical fingerprint collection further includes a detecting unit 705. The detecting unit 705 is configured to detecting, with an angular velocity sensor, an angular velocity of the terminal, when the current time does not fall within the preset night-time interval. The execution unit 703 is further configured to skip execution of the fingerprint collection instruction, upon detecting that the angular velocity of the terminal is greater than a preset angular velocity.

In one embodiment, the detecting unit 701 is further configured to detect, with the AP, whether the current time falls within a preset daytime time interval, when the current ambient light intensity is higher than or equal to the preset light source intensity. The execution unit 703 is further configured to control the internal light source to emit the lights having the target light source intensity and control the optical fingerprint recognition module to collect the fingerprints with the lights having the target light source intensity.

According to the embodiments of the present disclosure, the internal light source of the optical fingerprint recognition module no longer emits lights of a same light source intensity for fingerprint collection, but adjusts an intensity of lights emitted by the internal light source according to an intensity of ambient lights, which can reduce interference of the ambient lights on the optical fingerprint collection. As such, the accuracy of the fingerprint data collected during the optical fingerprint collection can be improved.

Figure 8:
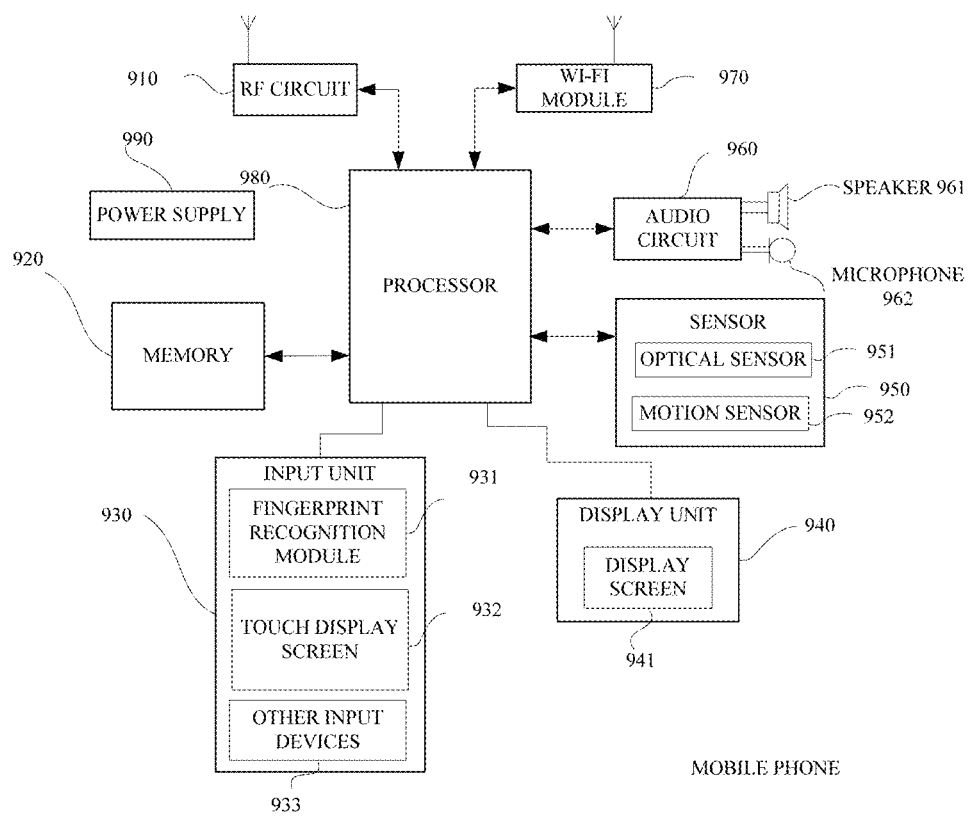
FIG. 8 a schematic structural diagram illustrating a terminal according to still another embodiment of the present disclosure.

Embodiments of the present disclosure also provide another terminal. As illustrated in FIG. 8, only parts related to embodiments of the present disclosure are illustrated for ease of description. For technical details not described, reference may be made to the method embodiments of the present disclosure. The terminal may be any terminal device, such as a mobile phone, a tablet PC, a personal digital assistant (PDA), a point of sale terminal (POS), an on-board computer, and the like. The following describes a mobile phone as an example of the terminal.

FIG. 8 is a block diagram illustrating a partial structure of a mobile phone related to a terminal according to an embodiment of the present disclosure. As illustrated in FIG. 8, the mobile phone includes a radio frequency (RF) circuit 910, a memory 920, an input unit 930, a display unit 940, a sensor 950, an audio circuit 960, a wireless fidelity (Wi-Fi) module 970, a processor 980, a power supply 990, and other components. Those skilled in the art can understand that the structure of the mobile phone illustrated in FIG. 8 does not constitute any limitation on a mobile phone. The mobile phone configured to implement technical solutions of the present disclosure may include more or fewer components than illustrated, or may combine certain components, or may adopt different arrangements of components.

In the following, various components of the mobile phone will be described in detail with reference to FIG. 8.

The RF circuit 910 is configured to receive or transmit information. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network or other devices via wireless communication. The wireless communication herein may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules. The processor 980 is configured to execute various function applications and data processing of the mobile phone by running the software programs and the modules stored in the memory 920. The memory 920 may mainly include a program storage area and a data storage area. The program storage area may store an operating system, applications required for at least one function, and the like. The data storage area may store data created according to the use of the smart phone, and the like. In addition, the memory 920 may include a high-speed random access memory (RAM), and may further include a non-transitory memory such as at least one disk storage device, a flash device, or other non-transitory solid-state storage devices.

The input unit 930 is configured to receive input digital or character information and generate key signal input associated with user setting and function control of the mobile phone. In one embodiment, the input unit 930 may include a fingerprint recognition module 931 (e.g., an optical fingerprint recognition module), a touch display screen 932, and other input devices 933. The fingerprint recognition module 931 can collect fingerprint data of the user. In addition to the fingerprint recognition module 931, the input unit 930 may further include other input devices 933. In one embodiment, other input devices 933 may include, but not limit to, one or more of a touch screen, a physical key, a function key (such as a volume control key, a switch key, etc.), a trackball, a mouse, a joystick, and the like.

The display unit 940 is configured to display information input by the user or information provided for the user or various menus of the mobile phone. The display unit 940 may include a display screen 941. In one example, the display screen 941 may be in the form of a liquid crystal display (LCD), an organic light-emitting diode (OLED), and so on. Although the fingerprint recognition module 931 and the display screen 941 are illustrated as two separate components in FIG. 8 to realize the input and output functions of the mobile phone, in some embodiments, the fingerprint recognition module 931 may be integrated with the display screen 941 to implement the input and fingerprint recognition functions of the mobile phone.

The mobile phone may further include at least one sensor 950, such as an optical sensor 951, a motion sensor 952, and other sensors. The optical sensor 951 may include an ambient light sensor and a proximity sensor. The ambient light sensor may adjust brightness of the display screen 941 according to ambient lights. The proximity sensor may turn off the display screen 941 and/or backlight when the mobile phone reaches nearby the ear. As a kind of the motion sensor 952, an accelerometer sensor can detect the magnitude of acceleration in all directions (typically three axes), and when the mobile phone is stationary, the accelerometer sensor can detect the magnitude and direction of gravity; the accelerometer sensor can also be applied to applications for identifying mobile-phone gestures (such as vertical and horizontal screen switching, related games, magnetometer attitude calibration), or the accelerometer sensor can be used for vibration-recognition related functions (such as a pedometer, or a percussion) and so on. The mobile phone can also be equipped with an angular velocity sensor, a barometer, a hygrometer, a thermometer, an infrared sensor, and other sensors, and it will not be repeated herein.

The audio circuit 960, a speaker 961, and a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals for output. On the other hand, the microphone 962 converts the received sound signals into electrical signals, which will be received and converted into audio data by the audio circuit 960 to be output to the processor 980. The audio data is then processed and transmitted by the processor 980 via the RF circuit 910 to another mobile phone for example, or the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 8, it should be understood that the Wi-Fi module 970 is not essential to the mobile phone and can be omitted according to actual needs without departing from the essential nature of the present disclosure.

The processor 980 is a control center of the mobile phone. The processor 980 is configured to connect various parts of the entire smart phone through various interfaces and lines, and to execute various functions of the smart phone and process data by running or executing software programs and/or modules stored in the memory 920 and invoking data stored in the memory 920, thereby monitoring the smart phone as a whole. In at least one example, the processor 980 may include one or more processing units. For example, the processor 980 is integrated with an application processor and a modem processor, where the application processor is mainly configured to handle an operating system, a user interface, applications, and so on, and the modem processor is mainly configured to process wireless communication. It will be appreciated that the modem processor mentioned above may not be integrated into the processor 980.

The mobile phone further includes the power supply 990 (e.g., a battery) that supplies power to various components. For instance, the power supply 990 may be logically coupled with the processor 980 via a power management system to achieve management of charging, discharging, and power consumption through the power management system.

Although not illustrated, a camera, a Bluetooth module, etc. may further be included in the mobile phone, which will not be elaborated herein.

Embodiments of the present disclosure further provide a non-transitory computer readable storage medium. The non-transitory computer readable storage medium stores a computer program which, when executed by a processor of a terminal, causes the processor to carry out following actions. When a fingerprint collection instruction is received, a current ambient light intensity is detected, and the current ambient light intensity is sent to an AP of the terminal. A target light source intensity corresponding to the current ambient light intensity is obtained according to a correspondence relationship between ambient light intensities and light source intensities. An internal light source of the terminal is controlled to emit lights having the target light source intensity and fingerprint collection is performed with the lights having the target light source intensity.

In one embodiment, the computer program, when executed by the processor, further causes the processor to carry out following actions. Whether the current ambient light intensity is lower than a preset light source intensity is determined. Upon determining that the current ambient light intensity is lower than the preset light source intensity, whether a current time falls within a preset night-time interval is detected. Upon detecting that the current time falls within the preset night-time interval, proceed to the controlling of the internal light source to emit the lights having the target light source intensity and the performing of fingerprint collection with the lights having the target light source intensity.

In one embodiment, the computer program, when executed by the processor, further causes the processor to carry out following actions. Upon detecting that the current time does not fall within the preset night-time interval, an angular velocity of the terminal is detected. Upon detecting that the angular velocity of the terminal is greater than a preset angular velocity, skip execution of the fingerprint collection instruction.

In one embodiment, the computer program, when executed by the processor, further causes the processor to carry out following actions. Upon detecting that the angular velocity of the terminal is smaller than or equal to the preset angular velocity, proceed to the controlling of the internal light source to emit the lights having the target light source intensity and the performing of fingerprint collection with the lights having the target light source intensity.

In one embodiment, the computer program, when executed by the processor, further causes the processor to carry out following actions. Upon determining that the current ambient light intensity is higher than or equal to the preset light source intensity, whether the current time falls within a preset daytime time interval is detected. Upon detecting that the current time falls within the preset daylight time interval, proceed to the controlling of the internal light source to emit the lights having the target light source intensity and the performing of fingerprint collection with the lights having the target light source intensity.

In one embodiment, the terminal further includes a touch display screen. The projection of a fingerprint recognition area of the optical fingerprint recognition module falls on a first area of the touch display screen. The fingerprint collection instruction is generated when the touch screen display detects a touch operation of a user in the first area.

In one embodiment, according to the correspondence relationship, the ambient light intensity is in a positive correlation with the light source intensity, and the light source intensity is higher than the ambient light intensity corresponding to the light source intensity.

Embodiments of the present disclosure further provide a computer program product.

The computer program product includes a non-transitory computer readable storage medium which is configured to store computer programs, the computer programs are operable with a computer to execute part or all of the operations of any of the method for optical fingerprint collection described in the foregoing method embodiments.

It is to be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be executed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the present disclosure, it should be understood that, the apparatus disclosed in embodiments provided herein may be implemented in other manners. For example, the device/apparatus embodiments described above are merely illustrative; for instance, the division of the unit is only a logical function division and there can be other manners of division during actual implementations, for example, multiple units or components may be combined or may be integrated into another system, or some features may be ignored or not executed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to execute all or part of the steps described in the various embodiments of the present disclosure. The memory includes various medium capable of storing program codes, such as a universal serial bus (USB) flash disk, a read-only memory (ROM), a random access memory (RAM), a removable hard disk, disk, compact disc (CD), or the like.

It will be understood by those of ordinary skill in the art that all or a part of the various methods of the embodiments described above may be accomplished by means of a program to instruct associated hardware, the program may be stored in a computer-readable memory, which may include a flash memory, a ROM, a RAM, a disk or a CD, and so on.

The foregoing illustrates the embodiments of the present disclosure in detail. The principle and embodiments of the present disclosure are illustrated by specific examples. The illustration of the above embodiments are merely used to facilitate understanding of the methods and core concept of the present disclosure. For a person skilled in the art, according to the concept of the present disclosure, specific embodiments and application scopes may be both changed. Based on the above, the present disclosure shall not be understood to be limited to the specification.

What is claimed is:

1. A method for optical fingerprint collection, the method being applicable to a terminal comprising an application processor (AP), an optical sensor, and an optical fingerprint recognition module, the optical fingerprint recognition module comprising an internal light source, and the method comprising:

detecting, with the optical sensor, a current ambient light intensity when the terminal receives a fingerprint collection instruction, and sending, with the optical sensor, the current ambient light intensity to the AP;

obtaining, with the AP, a target light source intensity corresponding to the current ambient light intensity according to a correspondence relationship between ambient light intensities and light source intensities;

controlling, with the optical fingerprint recognition module, the internal light source to emit lights having the target light source intensity and performing, with the optical fingerprint recognition module, fingerprint collection with the lights having the target light source intensity; and prior to controlling, with the optical fingerprint recognition module, the internal light source to emit the lights having the target light source intensity and performing, with the optical fingerprint recognition module, fingerprint collection with the lights having the target light source intensity:

determining, with the AP, whether the current ambient light intensity is lower than a preset light source intensity;

detecting, with the AP, whether a current time falls within a preset night-time interval, upon determining that the current ambient light intensity is lower than the preset light source intensity; and proceeding to the controlling of the internal light source to emit the lights having the target light source intensity and the performing of fingerprint collection with the lights having the target light source intensity, upon detecting that the current time falls within the preset night-time interval.

2. The method of claim 1, wherein the terminal further comprises an angular velocity sensor, and the method further comprises: detecting, with the angular velocity sensor, an angular velocity of the terminal, upon detecting that the current time does not fall within the preset night-time interval; and skipping execution of the fingerprint collection instruction, upon detecting that the angular velocity of the terminal is greater than a preset angular velocity.

3. The method of claim 2, further comprising: proceeding to the controlling of the internal light source to emit the lights having the target light source intensity and the performing of fingerprint collection with the lights having the target light source intensity, upon detecting that the angular velocity of the terminal is smaller than or equal to the preset angular velocity.

4. The method of claim 1, further comprising: detecting, with the AP, whether the current time falls within a preset daytime time interval, upon determining that the current ambient light intensity is higher than or equal to the preset light source intensity; and proceeding to the controlling of the internal light source to emit the lights having the target light source intensity and the performing of fingerprint collection with the lights having the target light source intensity, upon detecting that the current time falls within the preset daylight time interval.

5. The method of claim 1, wherein the terminal further comprises a touch display screen, the optical fingerprint recognition module has a fingerprint recognition area located in a first area of the touch display screen, the fingerprint collection instruction is generated when the touch screen display detects a touch operation of a user in the first area.

6. The method of claim 1, wherein according to the correspondence relationship, the ambient light intensity is in a positive correlation with the light source intensity, and the light source intensity is higher than the ambient light intensity corresponding to the light source intensity.

7. A terminal, comprising
an application processor (AP), an optical sensor, and an optical fingerprint recognition module, the optical fingerprint recognition module comprising an internal light source;

the optical sensor being configured to detect a current ambient light intensity when the terminal receives a fingerprint collection instruction and send the current ambient light intensity to the AP;

the AP being configured to obtain a target light source intensity corresponding to the current ambient light intensity according to a correspondence relationship between ambient light intensities and light source intensities;

the optical fingerprint recognition module being configured to control the internal light source to emit lights having the target light source intensity and perform fingerprint collection with the lights having the target light source intensity;

wherein
the AP is further configured to determine whether the current ambient light intensity is lower than a preset light source intensity;

the AP is further configured to detect whether a current time falls within a preset night-time interval, when the current ambient light intensity is lower than the preset light source intensity; and the optical fingerprint recognition module is further configured to control the internal light source to emit the lights having the target light source intensity and perform fingerprint collection with the lights having the target light source intensity, when the current time falls within the preset night-time interval.

8. The terminal of claim 7, further comprising: an angular velocity sensor, configured to detect an angular velocity of the terminal, when the current time does not fall within the preset night-time interval; and the AP being further configured to skip execution of the fingerprint collection instruction, when the angular velocity sensor detects that the angular velocity of the terminal is greater than a preset angular velocity.

9. The terminal of claim 8, wherein the optical fingerprint recognition module is further configured to control the internal light source to emit the lights having the target light source intensity and perform fingerprint collection with the lights having the target light source intensity, when the angular velocity sensor detects that the angular velocity of the terminal is smaller than or equal to the preset angular velocity.

10. The terminal of claim 7, wherein the AP is further configured to detect whether the current time falls within a preset daytime time interval, when the current ambient light intensity is higher than or equal to the preset light source intensity; and the optical fingerprint recognition module is further configured to control the internal light source to emit the lights having the target light source intensity and perform fingerprint collection with the lights having the target light source intensity, when the current time falls within the preset daylight time interval.

11. The terminal of claim 7, wherein the terminal further comprises a touch display screen, the optical fingerprint recognition module has a fingerprint recognition area located in a first area of the touch display screen, the fingerprint collection instruction is generated when the touch screen display detects a touch operation of a user in the first area.

12. The terminal of claim 7, wherein according to the correspondence relationship, the ambient light intensity is in a positive correlation with the light source intensity, and the light source intensity is higher than the ambient light intensity corresponding to the light source intensity.

13. A non-transitory computer readable storage medium storing a computer program which, when executed by a processor of a terminal, causes the processor to carry out actions, comprising:
- detecting a current ambient light intensity when a fingerprint collection instruction is received, and sending the current ambient light intensity to an application processor (AP) of the terminal;
- obtaining a target light source intensity corresponding to the current ambient light intensity according to a correspondence relationship between ambient light intensities and light source intensities;
- controlling an internal light source of the terminal to emit lights having the target light source intensity and performing fingerprint collection with the lights having the target light source intensity;
- determining whether the current ambient light intensity is lower than a preset light source intensity;
- detecting whether a current time falls within a preset night-time interval, upon determining that the current ambient light intensity is lower than the preset light source intensity; and
- proceeding to the controlling of the internal light source to emit the lights having the target light source intensity and the performing of fingerprint collection with the lights having the target light source intensity, upon detecting that the current time falls within the preset night-time interval.

14. The non-transitory computer readable storage medium of claim 13, wherein the computer program, when executed by the processor, further causes the processor to carry out actions, comprising: detecting an angular velocity of the terminal, upon detecting that the current time does not fall within the preset night-time interval; and skipping execution of the fingerprint collection instruction, upon detecting that the angular velocity of the terminal is greater than a preset angular velocity.

15. The non-transitory computer readable storage medium of claim 14, wherein the computer program, when executed by the processor, further causes the processor to carry out actions, comprising: proceeding to the controlling of the internal light source to emit the lights having the target light source intensity and the performing of fingerprint collection with the lights having the target light source intensity, upon detecting that the angular velocity of the terminal is smaller than or equal to the preset angular velocity.

16. The non-transitory computer readable storage medium of claim 13, wherein the computer program, when executed by the processor, further causes the processor to carry out actions, comprising: detecting whether the current time falls within a preset daytime time interval, upon determining that the current ambient light intensity is higher than or equal to the preset light source intensity; and proceeding to the controlling of the internal light source to emit the lights having the target light source intensity and the performing of fingerprint collection with the lights having the target light source intensity, upon detecting that the current time falls within the preset daylight time interval.

17. The non-transitory computer readable storage medium of claim 13, wherein according to the correspondence relationship, the ambient light intensity is in a positive correlation with the light source intensity, and the light source intensity is higher than the ambient light intensity corresponding to the light source intensity.

* * * * *